US012401963B2

(12) United States Patent
Mate et al.

(10) Patent No.: US 12,401,963 B2
(45) Date of Patent: Aug. 26, 2025

(54) METHOD AND APPARATUS FOR FUSION OF VIRTUAL SCENE DESCRIPTION AND LISTENER SPACE DESCRIPTION

(71) Applicant: Nokia Technologies Oy, Espoo (FI)

(72) Inventors: Sujeet Shyamsundar Mate, Tampere (FI); Antti Eronen, Tampere (FI); Jussi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 158 days.

(21) Appl. No.: 18/269,892

(22) PCT Filed: Nov. 19, 2021

(86) PCT No.: PCT/FI2021/050787
§ 371 (c)(1),
(2) Date: Jun. 27, 2023

(87) PCT Pub. No.: WO2022/144493
PCT Pub. Date: Jul. 7, 2022

(65) Prior Publication Data
US 2024/0089694 A1 Mar. 14, 2024

(30) Foreign Application Priority Data
Dec. 29, 2020 (GB) ..................................... 2020673

(51) Int. Cl.
*H04S 7/00* (2006.01)

(52) U.S. Cl.
CPC .............. *H04S 7/306* (2013.01); *H04S 7/304* (2013.01); *H04S 2400/11* (2013.01)

(58) Field of Classification Search
CPC ...... H04S 7/304; H04S 7/306; H04S 2400/11; G10K 15/08
USPC .......................................................... 381/309
See application file for complete search history.

(56) References Cited

U.S. PATENT DOCUMENTS

2018/0232471 A1 8/2018 Schissler et al.
2019/0116448 A1* 4/2019 Schmidt .................. G06F 3/011

FOREIGN PATENT DOCUMENTS

WO WO 2020/231884 A1 11/2020

OTHER PUBLICATIONS

Leppanen, J. et al., "Listening Space Geometry Information in AR Testing for MPEG-I 6DoF Audio CfP," International Organisation for Standardisation, Coding of Moving Pictures and Audio, ISO/IEC JTC1/SC29/WG11 MPEG2020/M53586, Apr. 2020, Alpbach, Austria.

(Continued)

*Primary Examiner* — Paul Kim
(74) *Attorney, Agent, or Firm* — McCarter & English LLP

(57) ABSTRACT

An apparatus for rendering an audio scene in a physical space including circuitry configured to: determine a listening position within the physical space during rendering; obtain at least one information of a virtual scene to render the virtual scene according to the at least one information; obtain at least one acoustic characteristic of the physical space; prepare the audio scene using the at least one information of the virtual scene and the at least one acoustic characteristic of the physical space, such that the virtual scene acoustics and the physical space acoustics are merged; and render the prepared audio scene according to the listening position.

20 Claims, 6 Drawing Sheets

(56) References Cited

OTHER PUBLICATIONS

MPEG-I Audio Sub Group N19211,"MPEG-I 6DoF Audio Encoder Input Format," Coding of moving pictures and audio Convenorship: UNI (Italy), ISO/IEC JTC 1/SC 29/WG 11, Apr. 24, 2020.

WG6, MPEG Audio Coding "Draft Listening Space Description File for MPEG-I 6DoF AR Audio Evaluation" International Organisation for Standardisation Organisation Internationale De Normalisation ISO/IEC JT1/SC29/WG6, MPEG Audio Coding; ISO/IEC JTC1/SC29/WG6 N0012. Oct. 2020.

* cited by examiner

METHOD AND APPARATUS FOR FUSION OF VIRTUAL SCENE DESCRIPTION AND LISTENER SPACE DESCRIPTION

CROSS REFERENCE TO RELATED APPLICATION

This patent application is a U.S. National Stage application of International Patent Application Number PCT/FI2021/050787 filed Nov. 19, 2021, which is hereby incorporated by reference in its entirety, and claims priority to GB 2020673.6 filed Dec. 29, 2020.

FIELD

The present application relates to method and apparatus for fusion of virtual scene description and listener space description, but not exclusively for method and apparatus for fusion of virtual scene description in bitstream and listener space description for 6 degrees-of-freedom rendering.

BACKGROUND

Augmented Reality (AR) applications (and other similar virtual scene creation applications such as Mixed Reality (MR) and Virtual Reality (VR)) where a virtual scene is represented to a user wearing a head mounted device (HMD) have become more complex and sophisticated over time. The application may comprise data which comprises a visual component (or overlay) and an audio component (or overlay) which is presented to the user. These components may be provided to the user dependent on the position and orientation of the user (for a 6 degree-of-freedom application) within an Augmented Reality (AR) scene.

Scene information for rendering an AR scene typically comprises two parts. One part is the virtual scene information which may be described during content creation (or by a suitable capture apparatus or device) and represents the scene as captured (or initially generated). The virtual scene may be provided in an encoder input format (EIF) data format. The EIF and (captured or generated) audio data is used by an encoder to generate the scene description and spatial audio metadata (and audio signals), which can be delivered via the bitstream to the rendering (playback) device or apparatus. The EIF is described in MPEG-I 6DoF audio encoder input format developed for the call for proposals (CfP) on MPEG-I 6DoF Audio in the ISO/IEC JTC1 SC29 WG6 MPEG Audio coding. The implementation primarily is described in accordance with this specification but can also use other scene description formats that may be provided or used by the scene/content creator.

As per the EIF, the encoder input data contains information describing an MPEG-I 6DoF Audio scene. This covers all contents of the virtual auditory scene, i.e. all of its sound sources, and resource data, such as audio waveforms, source radiation patterns, information on the acoustic environment, etc. The content can thus contain both audio producing elements such as objects, channels, and higher order Ambisonics along with their metadata such as position and orientation and source directivity pattern, and non-audio producing elements such as scene geometry and material properties which are acoustically relevant. The input data also allows to describe changes in the scene. These changes, referred to as updates, can either happen at distinct times, allowing scenes to be animated (e.g. moving objects). Alternatively, they can be triggered manually or by a condition (e.g. listener enters proximity) or be dynamically updated from an external entity".

The second part of the AR audio scene rendering is related to the physical listening space of the listener (or end user). The scene or listener space information may be obtained during the AR rendering (when the listener is consuming the content).

Thus in implementing AR applications (compared to for example a Virtual Reality application which only features the captured virtual scene), the renderer has to consider the virtual scene acoustical properties as well as the ones arising from the physical space in which the content is being consumed. The listening space description is important so that the acoustics of audio rendering can be adjusted to the listening space. This is important for the plausibility of audio reproduction since it is desirable that the virtual audio objects are reproduced as if they were really in the physical space, creating an illusion of blending virtual objects with physical sound sources. For example, the reverberation characteristics of the space need to be reproduced to a suitable degree, along with other acoustic effects such as occlusion and/or diffraction.

The physical listening space information can be provided in a Listening Space Description File (LSDF) format. The LSDF information may be obtained by the rendering device during rendering. For example the LSDF information may be obtained using sensing or measurement around the rendering device, or some other means such as a file or data entry describing the listening space acoustics. LSDF is just one example of a file format facilitating describing listening space geometry and acoustic properties.

LSDF specifies the MPEG-I 6DoF Listening Space Description File (LSDF). The LSDF is being developed in the ISO/IEC JTC1 SC29 WG6 MPEG Audio coding. It describes the listening space for MPEG-I 6DoF audio AR implementations. In AR, where the virtual content is augmented on top of real-world objects and spaces, thus creating a perception of an "augmented reality" knowledge of the geometry of the listening space is important for realistic implementation. Furthermore, LSDF provides a mechanism to provide the listening space environment information directly to the renderer.

The LSDF includes a subset of elements of the MPEG-I 6DoF Audio Encoder Input Format. The elements are used to describe the physical aspects of the listening space (for example walls, ceiling and floor of the listening space, along with their acoustic material properties such as specular reflected energy, absorbed energy, diffuse reflected energy, transmitted energy, or coupled energy). Furthermore, the LSDF describes anchors for aligning elements in the scene EIF to positions in the listening space (e.g., physical features or objects).

The renderer can then perform rendering such that the scene is plausible and aligned with the information obtained from the LSDF and the EIF.

SUMMARY

There is provided according to a first aspect an apparatus comprising means configured to: determine a listening position within the physical space during rendering; obtain at least one information of a virtual scene to render the virtual scene according to the at least one information; obtain at least one acoustic characteristic of the physical space; prepare the audio scene using the at least one information of the virtual scene and the at least one acoustic characteristic of the physical space, such that the virtual scene acoustics and the physical space acoustics are merged; and render the prepared audio scene according to the listening position.

The means may further be configured to initially enable the audio scene for rendering in the physical space, wherein the audio scene may be configurable based on the at least one information of the virtual scene and the at least one acoustic characteristic of the physical space.

The means configured to obtain the at least one information of the virtual scene to render the virtual scene according to the at least one information may be configured to obtain at least one parameter representing an audio element of the virtual scene from a received bitstream.

The means may be further configured to obtain at least one control parameter, wherein the at least one control parameter may be configured to control the means configured to prepare the audio scene using the at least one information of the virtual scene and the at least one acoustic characteristic of the physical space, the at least one control parameter being obtained from a received bitstream.

The at least one parameter representing the audio element of the virtual scene may comprise at least one of: an acoustic reflecting element; an acoustic material; an acoustic audio element spatial extent; and an acoustic environment properties of a six-degrees of freedom virtual scene.

The at least one parameter representing the audio element of the virtual scene may comprise at least one of: geometry information associated with the virtual scene; a position of at least one audio element within the virtual scene; a shape of at least one audio element within the virtual scene; an acoustic material property of at least one audio element within the virtual scene; a scattering property of at least one audio element within the virtual scene; a transmission property of at least one audio element within the virtual scene; a reverberation time property of at least one audio element within the virtual scene; and a diffuse-to-direct sound ratio property of at least one audio element within the virtual scene.

The at least one parameter representing the audio element of the virtual scene may be part of a six-degrees of freedom bitstream which describes the virtual scene acoustics.

The means configured to obtain the at least one acoustic characteristic of the physical space may be configured to: obtain sensor information from at least one sensor positioned within the physical space; and determine at least one parameter representing the at least one acoustic characteristic of the physical space based on the sensor information.

The at least one parameter representing at least one acoustic characteristic of the physical space may comprise at least one of: specular reflected energy of at least one audio element within the physical space; absorbed energy of at least one audio element within the physical space; diffuse reflected energy of at least one audio element within the physical space; transmitted energy of at least one audio element within the physical space; coupled energy of at least one audio element within the physical space; geometry information associated with the physical space; a position of at least one audio element within the physical space; a shape of at least one audio element within the physical space; an acoustic material property of at least one audio element within the physical space; a scattering property of at least one audio element within the physical space; a transmission property of at least one audio element within the physical space; a reverberation time property of at least one audio element within the physical space; and a diffuse-to-direct sound ratio property of at least one audio element within the physical space.

The geometry information associated with the physical space may comprise at least one mesh element defining a physical space geometry.

Each of the at least one mesh elements may comprise at least one vertex parameter and at least one face parameter, wherein the each vertex parameter may define a position relative to a mesh origin position and each face parameter may comprise a vertex identifier configured to identify vertices defining a geometry of the face and a material parameter identifying an acoustic parameter defining an acoustic property associated with the face.

The material parameter identifying an acoustic parameter defining an acoustic property associated with the face may comprise at least one of: a scattering property of the face; a transmission property of the face; a reverberation time property of the face; and a diffuse-to-direct sound ratio property of the face.

The at least one acoustic characteristic of the physical space may be within a listening space description file.

The means configured to prepare the audio scene using the at least one information of the virtual scene and the at least one acoustic characteristic of the physical space, such that the virtual scene acoustics and the physical space acoustics are merged that may be configured to generate a combined parameter.

The combined parameter may be at least part of a unified scene representation.

The means configured to prepare the audio scene using the at least one information of the virtual scene and the at least one acoustic characteristic of the physical space may be configured to: merge a first bitstream comprising the at least one information of the virtual scene into a unified scene representation; and merge a second bitstream comprising the at least one acoustic characteristic of the physical space to the unified scene representation.

The means configured to prepare the audio scene using the at least one information of the virtual scene and the at least one acoustic characteristic of the physical space may be configured to: merge a first bitstream comprising the at least one information of the virtual scene into a unified scene representation; and merge the at least one acoustic characteristic of the physical space to the unified scene representation.

The means configured to prepare the audio scene using the at least one information of the virtual scene and the at least one acoustic characteristic of the physical space may be configured to: obtain at least one virtual scene description parameter based on the listening position within the physical space during rendering and the at least one information of the virtual scene; and generate a combined geometry parameter based on a combination of the at least one virtual scene description parameter and the at least one acoustic characteristic of the physical space.

The at least one acoustic characteristic of the physical space may comprise at least one of: at least one reflecting element geometry parameter; and at least one reflecting element acoustic property.

The means configured to generate the combined geometry parameter may be configured to: determine at least one reverberation acoustic parameter associated with the physical space based on the at least one acoustic characteristic of the physical space; determine at least one reverberation acoustic parameter associated with the virtual scene based on the at least one information of the virtual scene; and determine the combined geometry parameter based on the at least one reverberation acoustic parameter associated with the physical space and at least one reverberation acoustic parameter associated with the virtual scene.

According to a second aspect there is provided a method for an apparatus rendering an audio scene in a physical space, the method comprising: determining a listening position within the physical space during rendering; obtaining at least one information of a virtual scene to render the virtual scene according to the at least one information; obtaining at least one acoustic characteristic of the physical space; preparing the audio scene using the at least one information of the virtual scene and the at least one acoustic characteristic of the physical space, such that the virtual scene acoustics and the physical space acoustics are merged; and rendering the prepared audio scene according to the listening position.

The method may further comprise initially enabling the audio scene for rendering in the physical space, wherein the audio scene is configurable based on the at least one information of a virtual scene and the at least one acoustic characteristic of the physical space.

Obtaining the at least one information of the virtual scene to render the virtual scene according to the at least one information may comprise obtaining at least one parameter representing an audio element of the virtual scene from a received bitstream.

The method may further comprise obtaining at least one control parameter, wherein the at least one control parameter controls the preparing the audio scene using the at least one information of the virtual scene and the at least one acoustic characteristic of the physical space, the at least one control parameter being obtained from a received bitstream.

The at least one parameter representing the audio element of the virtual scene may comprise at least one of: an acoustic reflecting element, an acoustic material; an acoustic audio element spatial extent; and an acoustic environment properties of a six-degrees of freedom virtual scene.

The at least one parameter representing the audio element of the virtual scene may comprise at least one of: geometry information associated with the virtual scene; a position of at least one audio element within the virtual scene; a shape of at least one audio element within the virtual scene; an acoustic material property of at least one audio element within the virtual scene; a scattering property of at least one audio element within the virtual scene; a transmission property of at least one audio element within the virtual scene; a reverberation time property of at least one audio element within the virtual scene; and a diffuse-to-direct sound ratio property of at least one audio element within the virtual scene.

The at least one parameter representing the audio element of the virtual scene may be part of a six-degrees of freedom bitstream which describes the virtual scene acoustics.

Obtaining the at least one acoustic characteristic of the physical space may comprise: obtaining sensor information from at least one sensor positioned within the physical space; and determining at least one parameter representing the at least one acoustic characteristic of the physical space based on the sensor information.

The at least one parameter representing at least one acoustic characteristic of the physical space may comprise at least one of: specular reflected energy of at least one audio element within the physical space; absorbed energy of at least one audio element within the physical space; diffuse reflected energy of at least one audio element within the physical space; transmitted energy of at least one audio element within the physical space; coupled energy of at least one audio element within the physical space; geometry information associated with the physical space; a position of at least one audio element within the physical space; a shape of at least one audio element within the physical space; an acoustic material property of at least one audio element within the physical space; a scattering property of at least one audio element within the physical space; a transmission property of at least one audio element within the physical space; a reverberation time property of at least one audio element within the physical space; and a diffuse-to-direct sound ratio property of at least one audio element within the physical space.

The geometry information associated with the physical space may comprise at least one mesh element defining a physical space geometry.

Each of the at least one mesh elements may comprise at least one vertex parameter and at least one face parameter, wherein the each vertex parameter may define a position relative to a mesh origin position and each face parameter may comprise a vertex identifier configured to identify vertices defining a geometry of the face and a material parameter identifying an acoustic parameter defining an acoustic property associated with the face.

The material parameter identifying an acoustic parameter defining an acoustic property associated with the face may comprise at least one of: a scattering property of the face; a transmission property of the face; a reverberation time property of the face; and a diffuse-to-direct sound ratio property of the face.

The at least one acoustic characteristic of the physical space may be within a listening space description file.

The means configured to prepare the audio scene using the at least one information of the virtual scene and the at least one acoustic characteristic of the physical space, such that the virtual scene acoustics and the physical space acoustics are merged that may be configured to generate a combined parameter.

The combined parameter may be at least part of a unified scene representation.

Preparing the audio scene using the at least one information of the virtual scene and the at least one acoustic characteristic of the physical space may comprise: merging a first bitstream comprising the at least one information of the virtual scene into a unified scene representation; and merging a second bitstream comprising the at least one acoustic characteristic of the physical space to the unified scene representation.

Preparing the audio scene using the at least one information of the virtual scene and the at least one acoustic characteristic of the physical space may comprise: merging a first bitstream comprising the at least one information of the virtual scene into a unified scene representation; and merging the at least one acoustic characteristic of the physical space to the unified scene representation.

Preparing the audio scene using the at least one information of the virtual scene and the at least one acoustic characteristic of the physical space may comprise: obtaining at least one virtual scene description parameter based on the listening position within the physical space during rendering and the at least one information of the virtual scene; and generating a combined geometry parameter based on a combination of the at least one virtual scene description parameter and the at least one acoustic characteristic of the physical space.

The at least one acoustic characteristic of the physical space may comprise at least one of: at least one reflecting element geometry parameter; and at least one reflecting element acoustic property.

Generating the combined geometry parameter may comprise: determining at least one reverberation acoustic parameter associated with the physical space based on the at least one acoustic characteristic of the physical space; determining at least one reverberation acoustic parameter associated with the virtual scene based on the at least one information of the virtual scene; and determining the combined geometry parameter based on the at least one reverberation acoustic parameter associated with the physical space and at least one reverberation acoustic parameter associated with the virtual scene.

According to a third aspect there is provided an apparatus comprising at least one processor and at least one memory including a computer program code, the at least one memory and the computer program code configured to, with the at least one processor, cause the apparatus at least to: determine a listening position within the physical space during rendering; obtain at least one information of a virtual scene to render the virtual scene according to the at least one information; obtain at least one acoustic characteristic of the physical space; prepare the audio scene using the at least one information of the virtual scene and the at least one acoustic characteristic of the physical space, such that the virtual scene acoustics and the physical space acoustics are merged; and render the prepared audio scene according to the listening position.

The apparatus may further be caused to initially enable the audio scene for rendering in the physical space, wherein the audio scene may be configurable based on the at least one information of the virtual scene and the at least one acoustic characteristic of the physical space.

The apparatus caused to obtain the at least one information of the virtual scene to render the virtual scene according to the at least one information may be caused to obtain at least one parameter representing an audio element of the virtual scene from a received bitstream.

The apparatus may further be caused to obtain at least one control parameter, wherein the at least one control parameter may be configured to control the means configured to prepare the audio scene using the at least one information of the virtual scene and the at least one acoustic characteristic of the physical space, the at least one control parameter being obtained from a received bitstream.

The at least one parameter representing the audio element of the virtual scene may comprise at least one of: an acoustic reflecting element; an acoustic material; an acoustic audio element spatial extent; and an acoustic environment properties of a six-degrees of freedom virtual scene.

The at least one parameter representing the audio element of the virtual scene may comprise at least one of: geometry information associated with the virtual scene; a position of at least one audio element within the virtual scene; a shape of at least one audio element within the virtual scene; an acoustic material property of at least one audio element within the virtual scene; a scattering property of at least one audio element within the virtual scene; a transmission property of at least one audio element within the virtual scene; a reverberation time property of at least one audio element within the virtual scene; and a diffuse-to-direct sound ratio property of at least one audio element within the virtual scene.

The at least one parameter representing the audio element of the virtual scene may be part of a six-degrees of freedom bitstream which describes the virtual scene acoustics.

The apparatus caused to obtain the at least one acoustic characteristic of the physical space may be further caused to: obtain sensor information from at least one sensor positioned within the physical space; and determine at least one parameter representing the at least one acoustic characteristic of the physical space based on the sensor information.

The at least one parameter representing at least one acoustic characteristic of the physical space may comprise at least one of: specular reflected energy of at least one audio element within the physical space; absorbed energy of at least one audio element within the physical space; diffuse reflected energy of at least one audio element within the physical space; transmitted energy of at least one audio element within the physical space; coupled energy of at least one audio element within the physical space; geometry information associated with the physical space; a position of at least one audio element within the physical space; a shape of at least one audio element within the physical space; an acoustic material property of at least one audio element within the physical space; a scattering property of at least one audio element within the physical space; a transmission property of at least one audio element within the physical space; a reverberation time property of at least one audio element within the physical space; and a diffuse-to-direct sound ratio property of at least one audio element within the physical space.

The geometry information associated with the physical space may comprise at least one mesh element defining a physical space geometry.

Each of the at least one mesh elements may comprise at least one vertex parameter and at least one face parameter, wherein the each vertex parameter may define a position relative to a mesh origin position and each face parameter may comprise a vertex identifier configured to identify vertices defining a geometry of the face and a material parameter identifying an acoustic parameter defining an acoustic property associated with the face.

The material parameter identifying an acoustic parameter defining an acoustic property associated with the face may comprise at least one of: a scattering property of the face; a transmission property of the face; a reverberation time property of the face; and a diffuse-to-direct sound ratio property of the face.

The at least one acoustic characteristic of the physical space may be within a listening space description file.

The apparatus caused to prepare the audio scene using the at least one information of the virtual scene and the at least one acoustic characteristic of the physical space, such that the virtual scene acoustics and the physical space acoustics are merged that may be caused to generate a combined parameter.

The combined parameter may be at least part of a unified scene representation.

The apparatus caused to prepare the audio scene using the at least one information of the virtual scene and the at least one acoustic characteristic of the physical space may be caused to: merge a first bitstream comprising the at least one information of the virtual scene into a unified scene representation; and merge a second bitstream comprising the at least one acoustic characteristic of the physical space to the unified scene representation.

The apparatus caused to prepare the audio scene using the at least one information of the virtual scene and the at least one acoustic characteristic of the physical space may be caused to: merge a first bitstream comprising the at least one information of the virtual scene into a unified scene representation; and merge the at least one acoustic characteristic of the physical space to the unified scene representation.

The apparatus caused to prepare the audio scene using the at least one information of the virtual scene and the at least one acoustic characteristic of the physical space may be caused to: obtain at least one virtual scene description parameter based on the listening position within the physical space during rendering and the at least one information of the virtual scene; and generate a combined geometry parameter based on a combination of the at least one virtual scene description parameter and the at least one acoustic characteristic of the physical space.

The at least one acoustic characteristic of the physical space may comprise at least one of: at least one reflecting element geometry parameter; and at least one reflecting element acoustic property.

The apparatus caused to generate the combined geometry parameter may be caused to: determine at least one reverberation acoustic parameter associated with the physical space based on the at least one acoustic characteristic of the physical space; determine at least one reverberation acoustic parameter associated with the virtual scene based on the at least one information of the virtual scene; and determine the combined geometry parameter based on the at least one reverberation acoustic parameter associated with the physical space and at least one reverberation acoustic parameter associated with the virtual scene.

According to a fourth aspect there is provided an apparatus comprising at least one processor and at least one memory including a computer program code, the at least one memory and the computer program code configured to, with the at least one processor, cause the apparatus at least to: determine a listening position within the physical space during rendering; obtain at least one information of a virtual scene to render the virtual scene according to the at least one information; obtain at least one acoustic characteristic of the physical space; prepare the audio scene using the at least one information of the virtual scene and the at least one acoustic characteristic of the physical space, such that the virtual scene acoustics and the physical space acoustics are merged; and render the prepared audio scene according to the listening position.

According to a fifth aspect there is provided an apparatus comprising: means for determining a listening position within the physical space during rendering; obtain at least one information of a virtual scene to render the virtual scene according to the at least one information; means for obtaining at least one acoustic characteristic of the physical space; means for preparing the audio scene using the at least one information of the virtual scene and the at least one acoustic characteristic of the physical space, such that the virtual scene acoustics and the physical space acoustics are merged; and means for rendering the prepared audio scene according to the listening position.

According to a sixth aspect there is provided a computer program comprising instructions [or a computer readable medium comprising program instructions] for causing an apparatus to perform at least the following: determine a listening position within the physical space during rendering; obtain at least one information of a virtual scene to render the virtual scene according to the at least one information; obtain at least one acoustic characteristic of the physical space; prepare the audio scene using the at least one information of the virtual scene and the at least one acoustic characteristic of the physical space, such that the virtual scene acoustics and the physical space acoustics are merged; and render the prepared audio scene according to the listening position.

According to a seventh aspect there is provided a non-transitory computer readable medium comprising program instructions for causing an apparatus to perform at least the following: determining a listening position within the physical space during rendering; obtaining at least one information of a virtual scene to render the virtual scene according to the at least one information; obtaining at least one acoustic characteristic of the physical space; preparing the audio scene using the at least one information of the virtual scene and the at least one acoustic characteristic of the physical space, such that the virtual scene acoustics and the physical space acoustics are merged; and rendering the prepared audio scene according to the listening position.

According to a eighth aspect there is provided an apparatus comprising: determining circuitry configured to determine a listening position within the physical space during rendering; obtaining circuitry configured to obtain at least one information of a virtual scene to render the virtual scene according to the at least one information; obtaining circuitry configured to obtain at least one acoustic characteristic of the physical space; preparing circuitry configured to prepare the audio scene using the at least one information of the virtual scene and the at least one acoustic characteristic of the physical space, such that the virtual scene acoustics and the physical space acoustics are merged; and rendering circuitry configured to render the prepared audio scene according to the listening position.

According to a ninth aspect there is provided a computer readable medium comprising program instructions for causing an apparatus to perform at least the following: determining a listening position within the physical space during rendering; obtain at least one information of a virtual scene to render the virtual scene according to the at least one information; means for obtaining at least one acoustic characteristic of the physical space; means for preparing the audio scene using the at least one information of the virtual scene and the at least one acoustic characteristic of the physical space, such that the virtual scene acoustics and the physical space acoustics are merged; and means for rendering the prepared audio scene according to the listening position.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
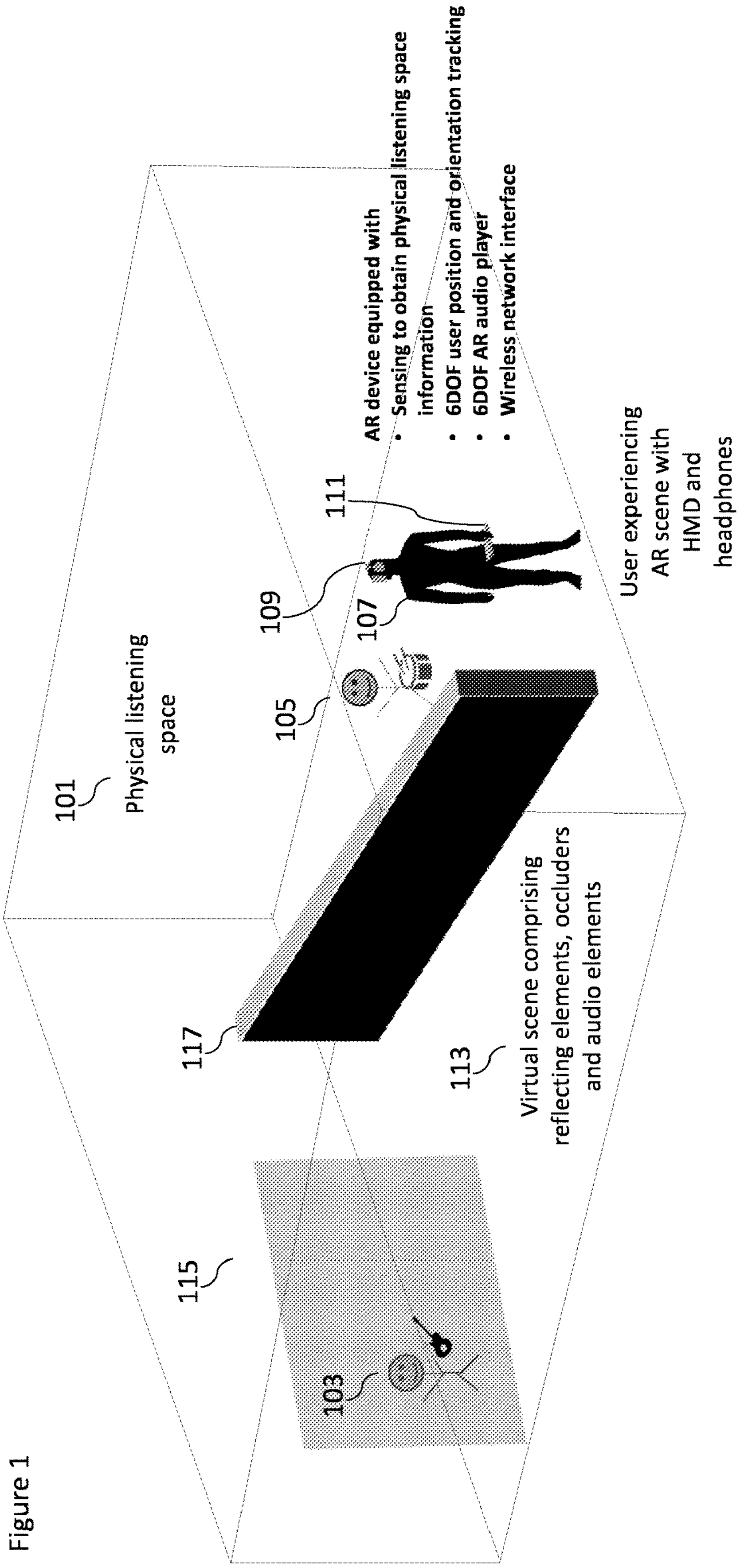
FIG. 1 shows schematically a suitable environment within which a system of apparatus may implement some embodiments.

The following describes in further detail suitable apparatus and possible mechanisms for combining the content creator specified EIF and the listener space dependent LSDF to create a combined scene for rendering in Augmented Reality (and associated) applications.

Furthermore, as discussed herein there is apparatus and possible mechanisms providing a practical rendering for immersive audio within AR applications.

The embodiments as described herein combine listening space properties and virtual scene rendering parameters to obtain a fused rendering which provides appropriate audio performance irrespective of the scene properties.

The fusion (or combination) as described in some embodiments is implemented such that the auralization is agnostic or unaware of whether the rendering is for AR or VR. In other words, the embodiments as described herein may be implemented within a system suitable for performing AR, VR (and mixed reality (MR)). Such a mechanism allows AR rendering to be deployable with many different auralization implementations.

In some embodiments the apparatus and possible mechanisms as described herein may be implemented within a system with 6-degrees-of-freedom (i.e., the listener or listening position can move within the scene and the listener position is tracked) binaural rendering of audio.

In such embodiments there is proposed apparatus and methods that use information from the audio scene specified in the bitstream comprising a virtual scene description and a description of the listener's physical space obtained during rendering to obtain a unified scene representation which enables auralization which is agnostic to the virtual and physical space and delivers high quality immersion within the physical space.

In some embodiments this may be achieved by validating and determining acoustic elements from the listener's physical space description and adding them to the virtual scene description which consists of the virtual scene acoustic elements to create an enhanced virtual scene description.

Furthermore, the methods and apparatus in some embodiments can determine reverberation parameters for the one or more acoustic environments which comprise the listener's physical space description.

In some embodiments the methods and apparatus can be configured to create a unified scene representation using the enhanced virtual scene description and the one or more reverberation parameters.

As a result, the unified scene representation in some embodiments comprises information which combines both the virtual scene acoustic information and physical scene acoustic information.

In such implementations when audio is rendered using such unified scene representation, the rendered audio results in an immersive and/or natural audio perception in the listener as he perceives the combined or fused acoustic effect of both virtual and physical acoustic elements.

In some embodiments the acoustic parameters comprise at least one of: reflecting element; acoustic material description; occlusion element; material acoustic reflectivity; material acoustic absorption; material acoustic transmission; material amount of scattered energy; and material coupled energy.

The apparatus and methods in some embodiments further comprises using at least one of the reflecting elements, acoustic parameters, or occlusion elements in the fused audio scene for producing an audio signal in a virtual acoustics renderer.

In some embodiments depending on the metadata carried in the bitstream, only a subset of the acoustic parameter properties are combined for the fused audio scene. For example, only the listener space geometry and material properties are incorporated but not the reverb parameters.

In yet some further embodiments only a subset of reflecting elements from the listener's physical space description are incorporated or excluded for creating the fused scene, based on the optimizations performed in the renderer.

In such embodiments as described herein the apparatus and methods creates a unified scene representation which further enables the rendering to be agnostic to whether the acoustic properties belong to the physical listening space or to the bitstream delivered virtual scene and therefore as described above may be implemented in a system able to handle AR and VR applications.

FIG. 1 shows an example scene within which some embodiments may be implemented. In this example there is a user 107 who is located within a physical listening space 101. Furthermore in this example the user 109 is experiencing a six-degree-of-freedom (6DOF) virtual scene 113 with virtual scene elements. In this example the virtual scene 113 elements are represented by two audio objects, a first object 103 (guitar player) and second object 105 (drummer), a virtual occlusion element (e.g., represented as a virtual partition 117) and a virtual room 115 (e.g., with walls which have a size, a position, and acoustic materials which are defined within the virtual scene description). The acoustic properties of the listener's physical space 101 are required for the renderer (which in this example is a AR headset or hand held electronic device or apparatus 111) to perform the rendering so that the auralization is plausible for the user's physical listening space (e.g., position of the walls and the acoustic material properties of the wall). The rendering is presented to the user 107 in this example by a suitable headphone or headset 109.

Figure 2:
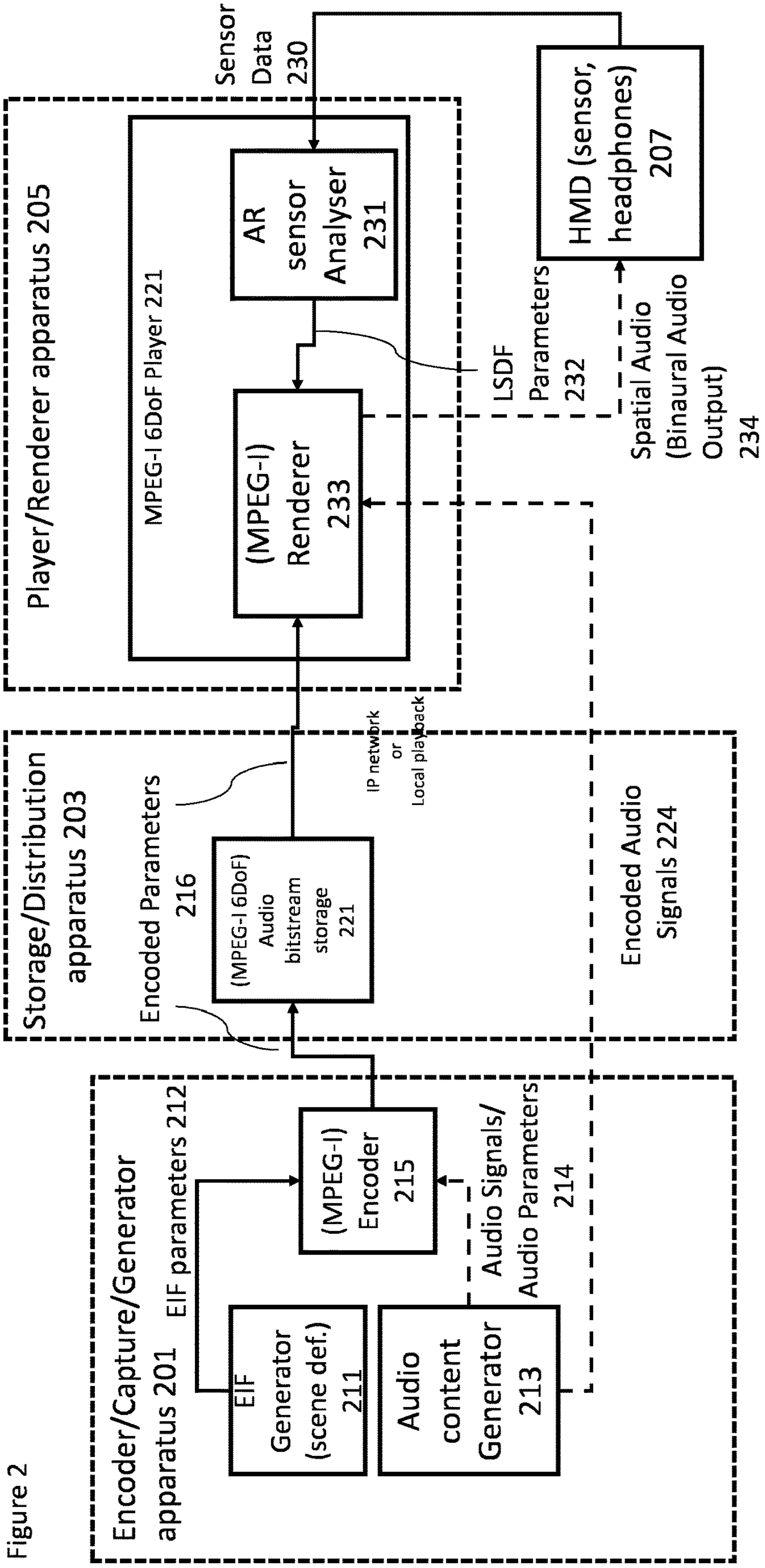
FIG. 2 shows schematically a system of apparatus suitable for implementing some embodiments.

With respect to FIG. 2 there is shown a schematic view of a system suitable for providing the augmented reality (AR) rendering implementation according to some embodiments (and which can be used for a scene such as shown in FIG. 1).

In the example shown in FIG. 2 there is shown an encoder/capture/generator apparatus 201 configured to obtain the content in the form of virtual scene definition parameters and audio signals and provide a suitable bitstream/data-file comprising the audio signals and virtual scene definition parameters.

In some embodiments as shown in FIG. 2 the encoder/capture/generator apparatus 201 comprises an encoder input format (EIF) data generator 211. The encoder input format (EIF) data generator 211 is configured to create EIF (Encoder Input Format) data, which is the content creator scene description. The scene description information contains virtual scene geometry information such as positions of audio elements. Furthermore the scene description information may comprise other associated metadata such as directivity and size and other acoustically relevant elements. For example the associated metadata could comprise positions of virtual walls and their acoustic properties and other acoustically relevant objects such as occluders. An example of acoustic property is acoustic material properties such as (frequency dependent) absorption or reflection coefficients, amount of scattered energy, or transmission properties. In some embodiments, the virtual acoustic environment can be described according to its (frequency dependent) reverberation time or diffuse-to-direct sound ratio. The EIF data generator 211 in some embodiments may be more generally known as a virtual scene information generator. The EIF parameters 212 can in some embodiments be provided to a suitable (MPEG-I) encoder 215.

In some embodiments the encoder/capture/generator apparatus 201 comprises an audio content generator 213. The audio content generator 213 is configured to generate the audio content corresponding to the audio scene. The audio content generator 213 in some embodiments is configured to generate or otherwise obtain audio signals associated with the virtual scene. For example in some embodiments these audio signals may be obtained or captured using suitable microphones or arrays of microphones, be based on processed captured audio signals or synthesised. In some embodiments the audio content generator 213 is furthermore configured in some embodiments to generate or obtain audio parameters associated with the audio signals such as position within the virtual scene or directivity of the signals. The audio signals and/or parameters 212 can in some embodiments be provided to a suitable (MPEG-I) encoder 215.

The encoder/capture/generator apparatus 201 may further comprise a suitable (MPEG-I) encoder 215. The MPEG-I encoder 215 in some embodiments is configured to use the received EIF parameters 212 and audio signals/parameters 214 and based on this information generate a suitable encoded bitstream. This can for example be a MPEG-I 6DoF Audio bitstream. In some embodiments the encoder 214 can be a dedicated encoding device. The output of the encoder can be passed to a distribution or storage device. The audio signals within the MPEG-I 6DoF audio bitstream can in an embodiment be encoded in the MPEG-H 3D format, which is described in ISO/IEC 23008-3:2018 High efficiency coding and media delivery in heterogenous environments—Part 3: 3D audio. This specification describes suitable coding methods for audio objects, channels, and higher order ambisonics. The low complexity (LC) profile of this specification may be particularly useful for encoding the audio signals.

In some embodiments the most relevant reflecting elements in case of the defining of the virtual scene can be derived by the encoder 215. In other words the encoder 215 can be configured to select or filter from the list of elements within the virtual scene relevant elements and only encode and/or pass parameters based on these to the player/renderer. This will avoid sending the redundant reflecting elements in the bitstream to the renderer. The most relevant reflecting elements can be determined, for example, based on their size and/or likelihood of being intercepted by one or more simulated audio wavefronts in a virtual acoustic simulation. The material parameters may then be delivered for all the reflecting elements which are not acoustically transparent. The material parameters can contain parameters related to the reflection or absorption parameters, transmission, or other acoustic properties. For example, the parameters can comprise absorption coefficients at octave or third octave frequency bands.

In some embodiments the virtual scene description also consists of one or more acoustic environment descriptions which are applicable to the entire scene or a certain sub-space/sub-region/sub-volume of the entire scene. The virtual scene reverberation parameters in some embodiments are derived based on the reverberation characterization information such as pre-delay, −60 dB reverberation time (RT60) which specifies the time required for an audio signal to decay to 60 dB below the initial level, or Diffuse-to-Direct-Ratio (DDR) which specifies the level of the diffuse reverberation relative to the level of the total emitted sound in each of the acoustic environment descriptions specified in the EIF. RT60 and DDR can be frequency dependent properties.

Furthermore the system of apparatus shown in FIG. 2 comprises (an optional) storage/distribution apparatus 203. The storage/distribution apparatus 203 is configured to obtain, from the encoder/capture/generator apparatus 201, the encoded parameters 216 and encoded audio signals 224 and store and/or distribute these to a suitable player/renderer apparatus 205. In some embodiments the functionality of the storage/distribution apparatus 203 is integrated within the encoder/capture/generator apparatus 201.

In some embodiments the bitstream is distributed over a network with any desired delivery format. Example delivery formats which may be employed in some embodiments can be done with any suitable approach such as DASH (Dynamic Adaptive Streaming over HTTP), CMAF (Common Media Application Format), HLS (HTP live streaming), etc.

In some embodiments such as shown in FIG. 2 the audio signals are transmitted in a separate data stream to the encoded parameters. Thus for example in some embodiments the storage/distribution apparatus 203 comprises a (MPEG-I 6DoF) audio bitstream storage 221 configured to obtain, store/distribute the encoded parameters 216. In some embodiments the audio signals and parameters are stored/transmitted as a single data stream or format.

The system of apparatus as shown in FIG. 2 further comprises a player/renderer apparatus 205 configured to obtain, from the storage/distribution apparatus 203 the encoded parameters 216 and encoded audio signals 224. Additionally in some embodiments the player/renderer apparatus 205 is configured to obtain sensor data (associated with the physical listening space) 230 and configured to generate a suitable rendered audio signal or signals which are provided the user (for example as shown in FIG. 2 a head mounted device headphones).

The player/renderer apparatus 205 in some embodiments comprises a (MPEG-I 6DoF) player 221 configured to receive the 6DoF bitstream 216 and audio data 224. The player 221 in some embodiments may in case of AR rendering the device is also expected to be equipped with AR sensing module to obtain the listening space physical properties.

The 6DoF bitstream (with the audio signals) alone is sufficient to perform rendering in VR scenarios. That is, in VR scenarios the necessary acoustic information is carried in the bitstream and is sufficient for rendering the audio scene at different virtual positions in the scene, according to the virtual acoustic properties such as materials and reverberation parameters.

For AR scenarios, the renderer can obtain the listener space information using the AR sensing provided to the renderer for example in a LSDF format, during rendering. This provides information such as the listener physical space reflecting elements (such as walls, curtains, windows, opening between the rooms, etc.).

Thus for example in some embodiments the user or listener is operating (or wearing) a suitable head mounted device (HMD) 207. The HMD may be equipped with sensors configured to generate suitable sensor data 230 which can be passed to the player/renderer apparatus 205.

The player/renderer apparatus 205 (and the MPEG-I 6DoF player 221) furthermore in some embodiments comprises an AR sensor analyser 231. The AR sensor analyser 231 is configured to generate (from the HMD sensed data or otherwise) the physical space information. This can for example be in a LSDF parameter format and the relevant LSDF parameters 232 passed to a suitable renderer 233.

The player/renderer apparatus 205 (and the MPEG-I 6DoF player 221) furthermore in some embodiments comprises a (MPEG-I) renderer 233 configured to receive the virtual space parameters 216, the audio signals 224 and the physical listening space parameters 232 and generate suitable spatial audio signals which as shown in FIG. 2 are output to the HMD 207, for example as binaural audio signals to be output by headphones.

In some embodiments the virtual scene geometry and the material information can be configured to provide information for determining early reflection and occlusion modelling.

The renderer or player is therefore configured to obtain the virtual scene description from the encoded bitstream. The bitstream can contain the rendering parameters encapsulated in a manner analogous to MHAS packets (MPEG-H 3D audio stream). This enables transport of audio and audio metadata to be transported as packets, suitable for delivery over HTTP or other transport networks. The packet format also makes it suitable for delivery over DASH, HLS, CMAF, etc.

The rendering parameters for acoustic parameter modelling can be provided as a new MHAS packet called PACTYP_ACOUSTICPARAMS. The MHASPacketLabel shall be the same value as that of the MPEG-H content being consumed. This MHAS packet carries acoustic modeling information for the virtual scene derived from the EIF and is carried via the bitstream to the renderer. The MHAS packet PACTYPACOUSTICPARAMS contains the structure EIFAcousticParams.

```
aligned(8) EIFAcousticParams( ){
  unsigned int(1) eif__reverb__params__present;
  unsigned int(1) eif__earlyreflection__params__present;
  bit(6) reserved = 0;
  if(eif__reverb__params__present)
    ReverbParamsStruct( );
  if(eif__earlyreflection__params__present)
    EarlyReflectionParamsStruct( );
}
aligned(8) ReverbParamsStruct( ){
  unsigned int(8) num__acoustic__environments;
  for(i=0;i<num__acoustic__environments;i++){
    string acoustic__environment__id;
    unsigned int(8) reverb__input__type;
    AcousticEnvironmentRegionStruct( );
  }
}
```

In the example above ReverbParamsStruct( ) describes the parameters for reverberation modelling. Furthermore num_acoustic_environments number of acoustic environments in a given MHAS packet describes reverberation parameters. The above example further shows acoustic_environment_id which is an identifier of the acoustic environment. In some embodiments this is unique and no two acoustic environments shall have the same identifier.

The reverb_input_type parameter describes if the input for reverberation modelling will be direct audio, direct audio as well as early reflections, only early reflections, etc.

```
aligned(8) EIFAcousticEnvironmentRegionStruct( ){
  string virtual__acoustic__scene__box__id; //in some embodiments, this can be an
integer
  unsigned int(8) reverb__input__type;
  PositionStruct( );
  AcousticEnvironmentVolumeStruct( );//box or mesh
  unsigned int(8) num__delay__lines;
  for(i=0;i<num__delay__lines;i++){
    DelayLinesStruct( );
  }
  GraphicEqCascadeFilterforDDRStruct( );//DDR
}
aligned (8) DelayLineStruct( ){
  unsigned int(16) delay__line__length;//centimeters
  signed int(32) azimuth__value;//relative to the user
  signed int(32) elevation__value;//relative to the user
  GraphicEqCascadeFilterStruct( );
}
aligned(8) EarlyReflectionsParamsStruct( ){
  unsigned int(1) reflecting__elements__info__present;
  unsigned int(1) material__info__present;
  bit(6) reserved = 0;
  if(reflecting__elements__info__present)
    ReflectingElementsStruct( );
  if(material__info__present)
    ReflectionMaterialListStruct( );
}
aligned(8) ReflectingElementListStruct( ){
  unsigned int(32) num__reflecting__elements;
  for(i=0;i<num__reflecting__elements;i++){
    ReflectingElemenStruct( );
  }
}
aligned(8) ReflectingElementStruct( ){
  string reflecting__element__id;
  string material__id;
  unsigned int(16) num__vertices__of__element; //vertices which form the reflecting
element
  for(i=0;i<num__vertices__of__element;i++){
```

-continued

```
        PositionStruct( );
    }
}
aligned(8) PositionStruct( ){
    signed int(32) vertex__pos__x;
    signed int(32) vertex__pos__y;
    signed int(32) vertex__pos__z;
}
aligned(8) ReflectionMaterialListStruct( ){
    unsigned signed int(4) reflections__order;//represents the number of reflections
for a single ray
    unsigned signed int(16) num__triple__materials;
    if(reflections__order == 1){
        string material__id;
        unsigned signed int(16) num__single__materials;
        for(i=0;i<num__single__materials;i++){
            GraphicEqCascadeFilterStruct( );
        }
    }
    if(reflections__order == 2){
        string material__id1;
        string material__id2;
        unsigned signed int(16) num__dual__materials;
        for(i=0;i<num__dual__materials;i++){
            GraphicEqCascadeFilterStruct( );
        }
    }
    if(reflections__order == 3){
        string material__id1;
        string material__id2;
        string material__id2;
        unsigned signed int(16) num__triple__materials;
        for(i=0;i<num__triple__materials;i++){
            GraphicEqCascadeFilterStruct( );
        }
    }
}
aligned(8) GraphicEqCascadeFilterStruct( ){
    unsigned int(16) num__bands;
    signed int(32) level__db;
    for(i=0;i<num__bands;i++) {
        SecondOrderSectionStruct( );
    }
}
aligned(8) SecondOrderSectionStruct( ){
    signed int(32) b1;
    signed int(32) b2;
    signed int(32) a1;
    signed int(32) a2;
    signed int(32) F;
}
```

In some embodiments the AR scene description of the surrounding environment is generated or obtained based on multimodal sensors (visual, depth of field, infra-red, etc.). An example of which is shown in FIG. 2 where a HMD, worn by a user, comprises sensors configured to generate physical listening scene or environment information. Consequently, the player/renderer is typically only aware of the inner perimeter of the surrounding environment. This information can for example be expressed as a set of triangular meshes derived from a (depth) map of the listening space surroundings.

The AR sensing interface (the AR sensor analyser 231) in some embodiments is configured to transform the sensed representation into a suitable format (for example LSDF) in order to provide the listening space information in an interoperable manner which can cater to different renderer implementations as long as they are format (LSDF) compliant. The listening space information for example may be provided as a single mesh in the LSDF.

In some embodiments the physical listening space material information is associated with the mesh faces. The mesh faces together with the material properties represent the reflecting elements which are used for early reflections modelling.

The listening space description mesh can, in some embodiments, be processed to obtain an implicit containment box for describing the acoustic environment volume for which the acoustic parameters such as RT60, DDR are applicable. In some embodiments, the containment box can also be a containment mesh which does not conform to a simple shape (e.g., such as a cuboid, cylinder, sphere, etc.). In cases where the physical listening space comprises multiple acoustic environments, the LSDF can consist of multiple non-overlapping contiguous or non-contiguous set of meshes or multiple overlapping meshes comprising one or more acoustic environments.

The LSDF derived parameters can in some embodiments be transformed into analogous rendering parameter data structures for incorporating them into a unified scene representation (USR) by the renderer. These are obtained via the MHAS packet with packet type PACTYP_ARACOUSTICPARAMS. This is obtained via the LSDF interface which carries LSDF derived information. For LSDF derived parameters the following data structure is obtained from the rendering parameter derivation from LSDF:

```
aligned(8) LSDFAcousticParams( ){
    unsigned int(1) lsdf_reverb_params_present;
    unsigned int(1) lsdf_earlyreflection_params_present;
    bit(6) reserved = 0;
    if(eif_reverb_params_present)
        ReverbParamsStruct( );
    if(eif_earlyreflection_params_present)
        EarlyReflectionParamsStruct( );
}
```

Figure 3:
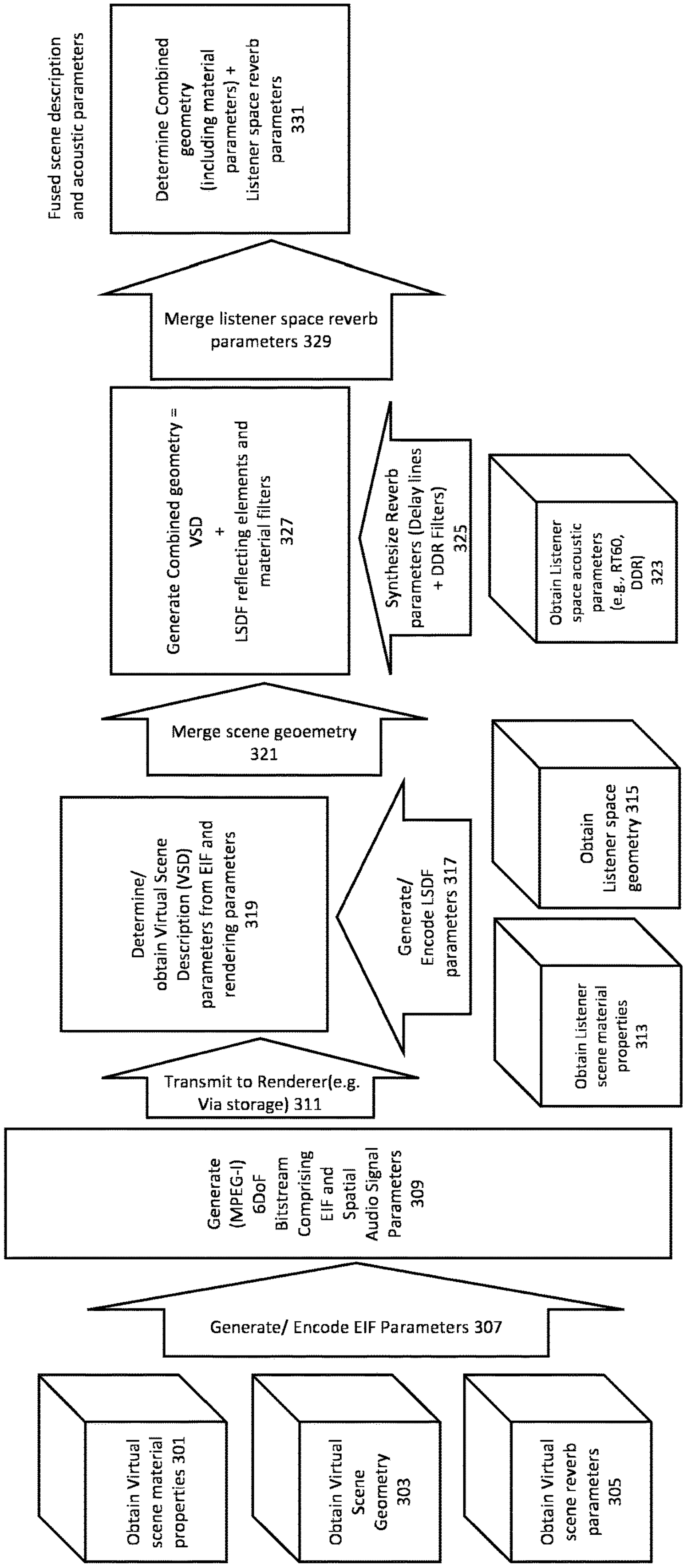
FIG. 3 shows a flow diagram of the operation of the example system of apparatus as shown in FIG. 2 according to some embodiments.

With respect to FIG. 3 is shown the operations of the apparatus shown in FIG. 2 according to some embodiments. In this example is shown a method which within the renderer is configured to obtain a unified scene representation (USR) which combines the information associated with the virtual scene and the physical listening space.

Thus for example the method may comprise in some embodiments obtaining the virtual scene material properties as shown in FIG. 3 by step 301.

Additionally in some embodiments the method may comprise obtaining the virtual scene geometry as shown in FIG. 3 by step 303.

Further the method may comprise obtaining the virtual scene reverberation parameters as shown in FIG. 3 by step 305.

Having obtained the virtual scene material properties, virtual scene geometry and virtual scene reverberation parameters then suitably formatted (EIF) virtual scene parameters can be generated (and/or encoded) as shown in FIG. 3 by step 307.

Having generated the suitably formatted (EIF) virtual scene parameters and obtained the audio signal parameters (such as location, diffuseness etc.) then a suitable (MPEG-I) 6DoF bitstream can be generated as shown in FIG. 3 by step 309.

The bitstream may then be transmitted to the renderer/playback apparatus as show in FIG. 3 by step 311.

The renderer thus may be configured to receive the acoustic parameters, for example, from an MHAS packet of type PACTYP_ACOUSTICPARAMS from the received bitstream. The EIFAcousticParamsStruct( ) contains the EarlyReflectionsParamsStruct( ) The renderer may be configured to extract the reflecting elements and the associated material properties from the ReflectingElementListStruct( ) Subsequently, the renderer may be configured to extract information for reverberation modelling from the ReverbParamsStruct( ) which is within the EIFAcousticParamsStruct( ) and carried in the same MHAS packet (PACTYP_ACOUSTICPARAMS). The reverberation parameters obtained from the bitstream are applicable to the virtual scene acoustic environments. These parameters can then as described herein be incorporated into the Unified Scene Description (USR). The position of the acoustic environment is specified in the AcousticEnvironmentRegionStruct( ) in the bitstream for the virtual scene (e.g., a virtual room in the physical environment as shown in FIG. 1. The reverberation modelling can in some embodiments be performed according to the ReverbParamsStruct( ) in the EIFAcousticParams( ) when the user is within AcousticEnvironmentVolumeStruct( ).

In some embodiments the listener space material properties are obtained as shown in FIG. 3 by step 313.

Furthermore in some embodiments the listener space geometry is obtained as shown in FIG. 3 by step 315.

Having obtained the listener space material properties and the listener space geometry then these may be used to generate (and/or encode) suitable listener space parameters in a suitable format (for example a series of LSDF parameters) as shown in FIG. 3 by step 317.

Having generated the suitable (MPEG-I) 6DoF bitstream and the suitable listener space parameters (LSDF parameters) and furthermore obtained rendering parameters (for example these may be orientation and/or location of the listener or user and which may be obtained from the head mounted device or user input apparatus) these values may be used to determine or obtain virtual scene description (VSD) parameters. The determination of the VSD parameters is shown in FIG. 3 by step 319.

Furthermore the scene geometry is then merged as shown in FIG. 3 by step 321. This merging may comprise extracting the listening space geometry and associated material properties from the LSDF. Then the renderer may input the properties as a MHAS_ARACOUSTICPARAMS MHAS packet. This MHAS packet contains the LSDFAcousticParams( ) as the payload. In some embodiments a EarlyReflectionParamsStruct( ) data structure is used to obtain the listening space geometry information. The reflecting and occlusion elements from the listening space are used to populate the USR data structure. Subsequently, a USR data structure may embody the unified scene geometry comprising the virtual scene as well as the listening space reflecting elements information.

Having obtained or generated the entire scene geometry, the rendering operation need not maintain or keep track of which reflecting elements belong to the bitstream derived (virtual) reflecting elements or the physical listening space. In other words the renderer may be configured to process the entire scene geometry as a single set.

Furthermore in some embodiments the addition of reflecting elements from the listening space to the USR, can result in early reflections modelling in reflections which originate from the physical listening space followed by secondary reflections with the virtual scene reflecting elements specified in the bitstream. Similarly, reflections originating from the virtual scene may have secondary reflections with the reflecting elements in the physical scene. These new reflection combinations are handled in case of a combined or fused scene. This can be done by additional reflecting material combinations to be determined in the renderer to add material filters based on the reflections_order in the ReflectionMaterialListStruct( ).

In such a manner a unified representation results in early reflections and occlusion rendering which is not constrained by a fusion of any number of reflecting or occluding elements present in either the bitstream specified virtual scene or the physical listening space. In some embodiments any suitable method can be used to perform subsequent processing of the early reflections information from the listening space. In some embodiments material filters for different reflection orders are not explicitly created but the renderer accumulates acoustic effect values, such as attenuation values at frequency bands, each time a sound wave reflects from a physical or virtual material, and then near the end of rendering a composite filter is designed to model the composite or aggregate response.

Furthermore in some embodiments the listener space acoustic parameters can be obtained in any suitable manner (for example from the sensors mounted on the HMD or otherwise). The parameters may include the reverberation time 60 (RT60) and/or DDR from the LSDF. The obtaining of the listener space acoustic parameters is shown in FIG. 3 by step 323.

Having obtained the listener space acoustic parameters then they can be used to synthesize suitable acoustic parameters as shown in FIG. 3 by step 325. In some embodiments a low-latency and computationally efficient reverberation parameter modelling (RPM) tool is used to derive reverberation parameters in the renderer. Reverberation parameters which are equivalent to those obtained via bitstream in terms of representation is obtained from such an RPM tool in the renderer or 6DoF audio player. The RPM tool in the renderer can in some embodiments be configured to output a parameter format defined as ReverbParamsStruct( ) to the renderer (for implementing a suitable processing or rendering of the spatial audio signals). The ReverbParamsStruct( ) in some embodiments is a subset of LSDFAcousticParams( ) which may be within the payload of a suitable MHAS_ARACOUSTICPARAMS MHAS packet. The reverberation parameters in an embodiment can comprise the parameters of a feedback-delay-network (FDN) reverberator. Such a reverberator contains M delay lines, where M=15, for example, which feed to each other via a unitary feedback matrix A. The parameters the delay lines can be represented in a DelayLineStruct. The parameters for a delay line can comprise its length (e.g. in centimeters), the spatial position where the output of the delay line is spatially rendered, and the attenuation filter parameters. The delay line length can be adjusted according to the physical or virtual scene dimensions such as its width, height, and/or depth. In an embodiment the attenuation filter can be an infinite impulse response (IIR) graphic equalizer filter. The graphic equalizer can be a cascade of second order section (SOS) IIR filters. In an embodiment the parameters for such a graphic equalizer can be represented in a GraphicEqCascadeFilterStruct. The graphic equalizer parameters at each delay line are adjusted such that it can be used to create a desired amount of attenuation per input sample so that the desired RT60 time is obtained. The RT60 can be provided in a frequency dependent manner at a number of frequency bands. The graphic equalizer can be correspondingly designed to provide the suitable attenuation at octave, third octave, or bark bands. In addition, the reverberator parameters can contain the parameters of a further graphic equalizer which is used to filter the incoming audio in order to adjust the level of diffuse reverberation according to the given DDR characteristics. Other reverberators with adjustable reverberation characteristics such as decaying noise sequences applied in the frequency domain can be used as well.

Having obtained the synthesised reverberation parameters and the virtual scene description format then a combined geometry may be generated based on the VSD and the LSDF reflecting elements and the material filters as shown in FIG. 3 by step 327.

The listener space reverberation parameters may then be merged as shown in FIG. 3 by step 329. Thus the renderer determined reverberation parameters can then be extracted from the MHAS packet in the ReverbParamsStruct( ) in the LSDFAcousticParams( ). The bitstream obtained acoustic environment properties for reverberation modelling as well as the physical listening space derived acoustic environment are further included in the USR.

The combined geometry is then determined including the material parameters and the listener space reverb parameters as shown in FIG. 3 by step 331. In such embodiments Each of the acoustic environments in the combined or fused audio scene can then be determined based on the AcousticEnvironmentVolumeStruct( ) in the AcousticEnvironmentRegionStruct( ). Thus, the reverb modelling is performed according to the listener position. If the audio source is in the region of one AcousticEnvironmentRegionStruct( ) while the listener is within the region of a second AcousticEnvironmentRegionStruct( ), the reverb modelling is performed with the second acoustic environment for audio sources within the second acoustic environment. For the audio sources in the first acoustic environment, the reflections passing into the second acoustic environment are processed according to the second acoustic environment reverb modelling parameters.

As a result of these operations a fused USR can be obtained.

In some embodiments, the LSDF can be directly used for combining the rendering parameters to generate a unified scene representation (USR). To perform this the LSDF is transformed into an in-memory data structure to enable easy manipulation.

The mesh description in the LSDF is extracted from the in-memory data structure and transformed into a reflecting and occlusion element representation of the USR. In some embodiments, localized simplification of the reflecting elements obtained from the LSDF is performed before combining it with the USR.

The acoustic environment information is extracted from the LSDF to obtain the reverberation description parameters (such as the DDR, RT60, pre-delay). This information can then be used by a suitable reverberation parameter derivation tool in the renderer. The reverberation parameters may be considered to be equivalent in their semantic information to the EIF derived reverb parameters. These are subsequently incorporated into the USR.

Similarly in case of partial merging of parameters from the bitstream and the physical space, only the necessary parameters are extracted from the in-memory representation of the LSDF to be incorporated in the USR.

Thus it can be seen that the USR derivation can be implemented with different approaches. The concept as shown in these embodiments is to merge the bitstream and physical space derived information to perform a holistic auralization of the audio scene.

Figure 4:
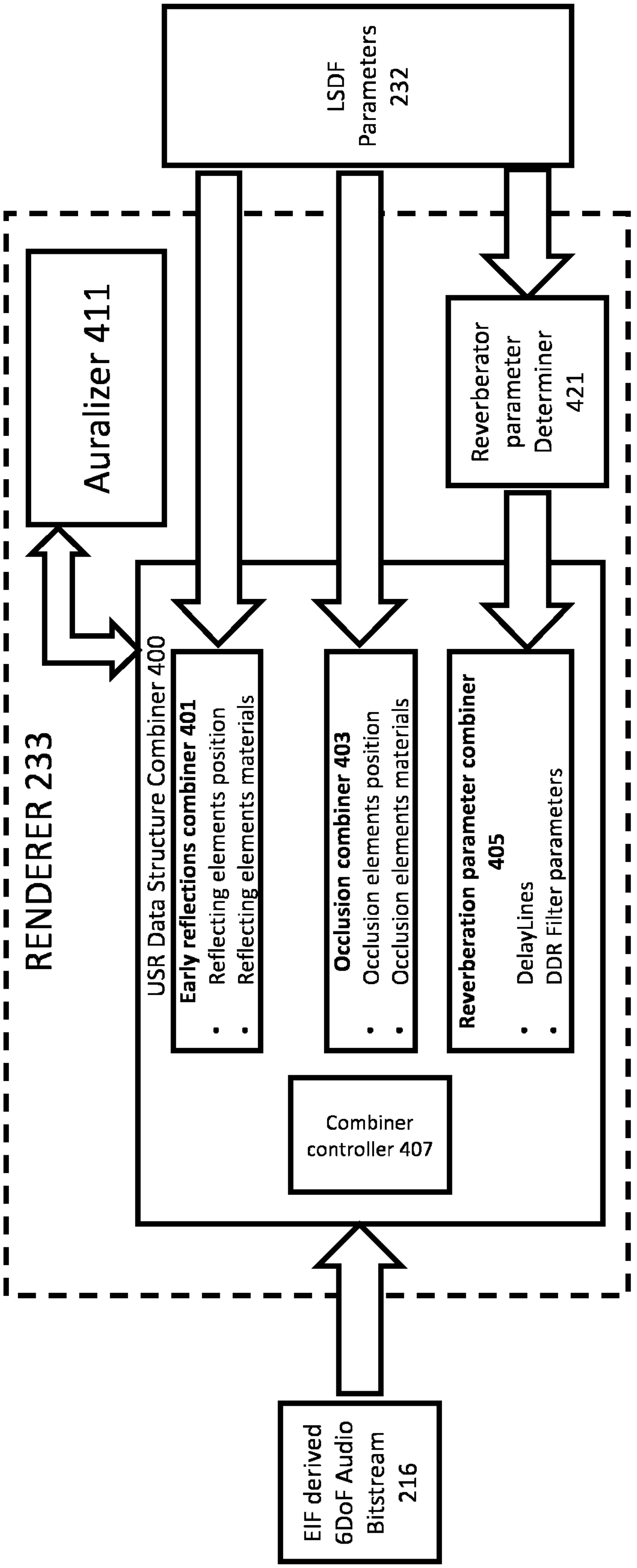
FIG. 4 shows schematically an example renderer as shown in FIG. 2 according to some embodiments.

With respect to FIG. 4 is shown an example USR fuser or combiner 400 as part of the renderer 323. The USR combiner 400 (which may also be known as a USR generator) in some embodiments comprises an early reflections combiner 401. The early reflections combiner 401 is configured to obtain the early reflections parameters from the LSDF and the bitstream (or EIF) and generate the unified early reflections modelling data structures. For example this can comprise the generating of unified reflecting elements position and the reflecting element material parameters.

In some embodiments the USR combiner 400 comprises an occlusion combiner 403. The occlusion combiner 403 is configured to obtain occlusion elements from the listening space as well as the virtual scene to obtain the unified occlusion parameter data structure. For example this can comprise the generating of unified occlusion elements position and the occlusion element material parameters.

Furthermore in some embodiments the USR combiner 400 comprises a reverberation parameter combiner 405. The reverberation parameter combiner 405 is configured to obtain reverberation parameters from the listening space (such as those determined or derived by a suitable reverberation parameter determiner 421) as well as the virtual scene from the bitstream (or EIF) to obtain the unified reverberation parameter data structure.

In some embodiments the USR combiner 400 comprises a fusion/combiner controller 407 configured to control the early reflections combiner 401, the occlusion combiner 403 and the reverberation parameter combiner 405. In some embodiments the controller 407 is configured to control the combining or fusion such that it is able to control the combining based on a determined implementation case or scenario. For example to control the combining within resource constrained conditions. In such a scenario the renderer can use complexity reduction mechanisms to guide the combining. This combiner controller may furthermore in some embodiments be configured to implement combination control analysis and complexity reduction.

The early reflections combiner 401, the occlusion combiner 403 and the reverberation parameter combiner 405 can in some embodiments output the combined or fused USR data structure to a spatial audio signal processor or auralizer 411.

The renderer 233 can thus comprise a suitable spatial audio signal processor 411 configured to subsequently perform auralization (or spatial audio signal processing) based on the rendering parameters determined by the USR combiner 400.

In such a manner the fusion or combining to generate the unified data structure may be considered to be an adaptation layer for different auralization (spatial audio signal processing) tools without requiring them to be aware of whether the rendering is for an AR or VR implementation.

In some embodiments the listening space information is further used to augment the virtual scene description from the bitstream. For example, reverberation parameters derived from the LSDF are used for reverberation modelling of the virtual scene. This may be implemented in some embodiments by replacing (if already present in bitstream metadata) or adding (if absent in the bitstream metadata) the ReverbParamsStruct( ) in the EIFAcousticEnvironmentRegionStruct. This is followed by adding zero padding to retain the subsequent structure of the bitstream or modifying the MHAS packet size to reflect the new size. In such embodiments any subsequent rendering is transparent to any spatial audio signal processing such as shown in FIG. 4. In a different implementation embodiment, instead of manipulating the received bitstream and LSDF MHAS packets, modification can be done directly within the USR.

In some further embodiments early reflections combination is performed based on the reflecting elements position obtained from the listening space information (e.g., LSDF) whereas the material properties are used from the bitstream (i.e. derived from EIF). This can be implemented in some embodiments by over-writing the ReflectingElementStruct( ) in the received bitstream.

In some further embodiments reverberation characteristics can be a combination of virtual reverberation characteristics and physical reverberation characteristics. For example, the VR bitstream can describe an acoustic environment with virtual dimensions with one or more acoustically relevant surfaces and/or materials and first reverberation characteristics. The LSDF information can describe a second acoustic environment with physical dimensions and second reverberation characteristics. The intended reproduction of the combined space can be such that the acoustics of the physical environment and the virtual environment can both affect the rendering and the virtual space can be directly connected with the physical environment. In this case, it is desirable that, for example, the sound of an audio object in the virtual environment is affected by both the acoustics of the virtual environment and the physical environment. For example, the early reflections are created as a combination of reflections caused by the virtual dimensions and surfaces of the virtual environment and the physical dimensions and surfaces of the physical environment. In an embodiment the combined acoustics is created by combining the acoustic environments of the virtual scene and the physical space so that there are two coupled acoustic environments where sound can travel between them, thus, the two environments are connected to each other. To create a plausible rendering of the space, also the reverberation characteristics can be combined. In an embodiment there are two reverberators, one which is adjusted according to the virtual environment reverberation characteristics and another one which is adjusted according to physical environment characteristics. When the listener is in the physical space and the sound source is in the virtual space, the sound source is reverberated with the virtual space reverberator, and this produces a reverberated output. This reverberated output can then be fed into the physical space reverberator, which further reverberates that sound to create an output which contains the reverberation characteristics of both coupled spaces.

Figure 5:
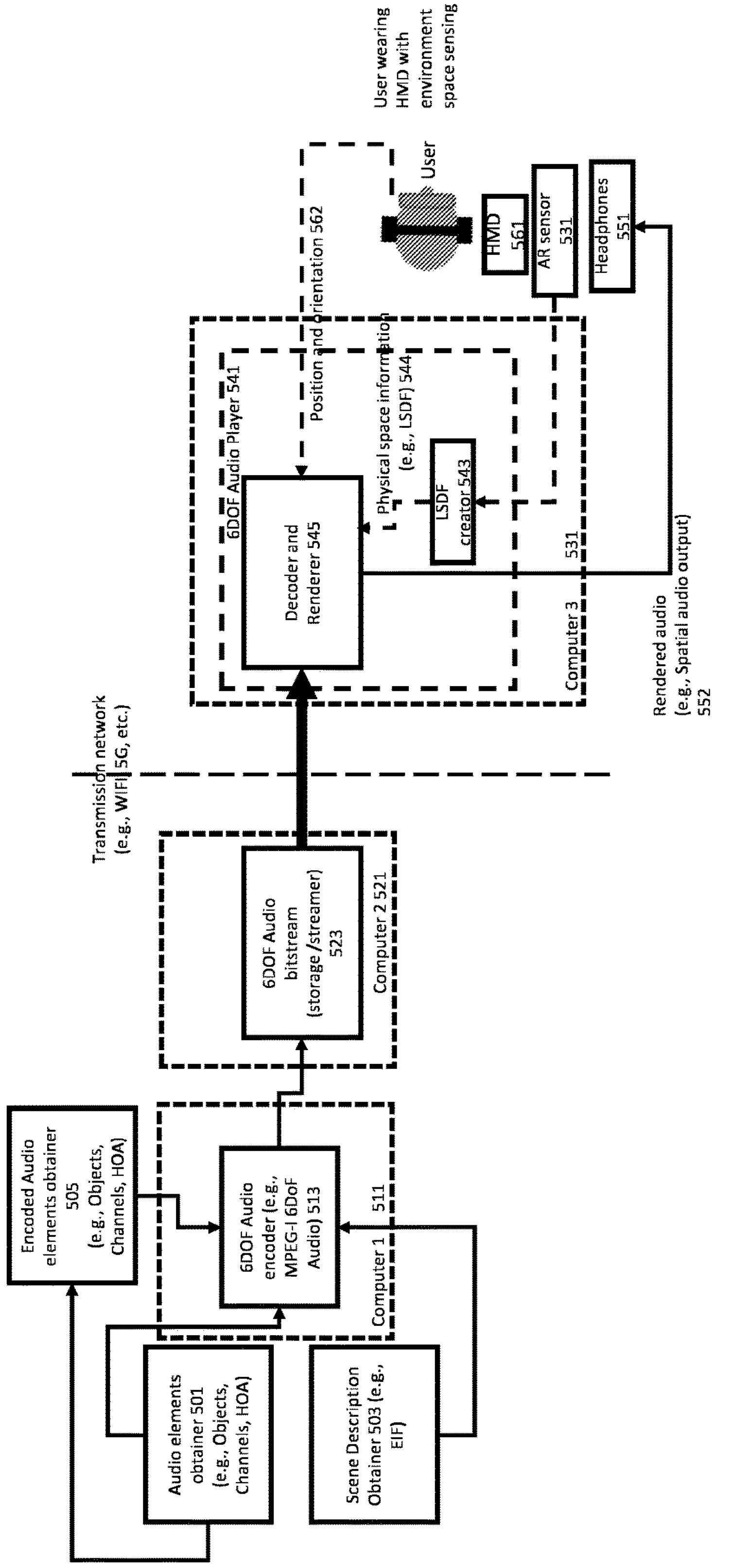
FIG. 5 shows schematically a further system of apparatus suitable for implementing some embodiments.

With respect to FIG. 5 an example system of apparatus is shown which may implement some embodiments is shown.

Thus is shown a scene description obtainer 503 which is configured to obtain the suitable EIF information and which is configured to pass the EIF information to a computer 1 511.

Further is shown an audio elements obtainer 501 configured to obtain audio element information (for example the information may comprise information about elements such as audio objects, object labels, the channels and higher order ambisonic information) and pass these to the computer 1 511 and in some embodiments to a further audio elements obtainer 501*b*.

Also is shown an encoded audio elements obtainer 505 configured to obtain (MPEG-H) encoded/decoded audio elements and pass these to the audio encoder 513.

The computer 1 511 may comprise a (6DoF) audio encoder 513 which is configured to receive the audio object information and the scene description information. This may for example be in the form of (raw) audio data as well as the encoded/decoded audio data and from this together with the EIF create the 6DoF scene in the form of a 6DoF bitstream (which will comprise the 6DoF rendering metadata). Furthermore the encoder 513 may be configured to encode the audio data, for example by implementing with an MPEG-H 3D or any other suitable codec. Thus in some embodiments the encoder is configured to generate an encoded 6DoF bitstream (comprising the 6DoF metadata) and an encoded audio data bitstream. In some embodiments the encoder is configured to combine both the encoded 6DoF bitstream (comprising the 6DoF metadata) and encoded audio data bitstream into a single bitstream, such that a single bitstream can contain the (MPEG-H) encoded audio signals as well as the 6DoF scene information for 6DoF rendering.

The encoded 6DoF bitstream (and encoded audio signals) may in some embodiments be stored in a server for storage or subsequent streaming. This is shown in FIG. 5 by the computer 2 521 and the 6DOF Audio bitstream (storage/streamer) 523.

Furthermore a user can consume an AR scene of interest using a HMD 561. The HMD 561 may be equipped with position and orientation tracking sensors configured to output position and orientation information 562 to a computer 3 531. The HMD 561 may furthermore be equipped with suitable AR sensing sensor configured to obtain the acoustic properties from the listener's physical environment and pass this to the computer 3 531 (and specifically a 6DoF audio player 541 and LSDF creator 543).

The computer 3 531 may comprise a 6DoF audio player 541 configured to retrieve the 6DoF bitstream which may comprise the (raw) audio data as well as the encoded/decoded audio data and the EIF. Additionally the computer 3 531 may be configured to receive the audio data (with the 6DoF bitstream), where the audio data may be MPEG-H coded.

Thus the computer 3 531 is configured to receive the information which would enable a suitable rendering of a 6DoF augmented reality (AR) scene where a physical space is overlayed with further audio objects, elements etc. The relevant audio and bitstream may be retrieved from the computer 2 531 (which may in some embodiments be a server) over a suitable access network. This network could be, for example, at least one of a WIFI/5G/LTE network.

The 6DoF audio player 541 furthermore is configured to obtain the listening space information from the HMD's AR sensing module 531 and obtain the LSDF information from the LSDF creator 543.

The 6DoF audio player 541 in some embodiments comprises a decoder and renderer 545 which is configured to perform the combining or fusion of the bitstream derived rendering parameters and the LSDF derived scene information. The rendering furthermore can in some embodiments be performed by the renderer based on the USR obtained from the combination to generate spatial audio 552 which the user can experience via the headphones 551 attached to the HMD 561.

In the examples indicated above the virtual scene and the physical listening space is one in which the user or listener is able to move in six-degrees of freedom. However it is understood that the scene and/or listening space can also be one in which the user or listener is able to move in less than six-degrees of freedom. For example the user may only be able to move on a single plane (for example a horizontal or vertical plane only), or may only be able to move in a limited manner about a single spot (a so called 3DoF+ scene or environment). In some embodiments the virtual scene or physical listening space is modelled only in two dimensions. As such the (6DoF) bitstreams may in some embodiments just be defined as bitstreams or data representing the virtual scene or physical listening space.

Figure 6:
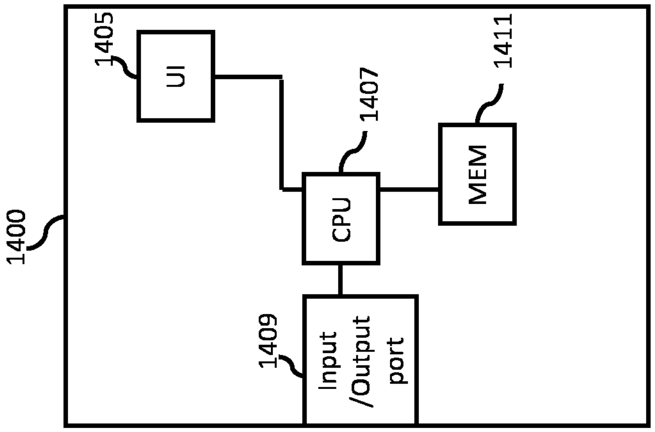
FIG. 6 shows schematically an example device suitable for implementing the apparatus shown.

With respect to FIG. 6 an example electronic device which may represent any of the apparatus shown above (for example computer 1 511, computer 2 521 or computer 3 531). The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus, comprising:

at least one processor; and at least one memory storing instructions that, when executed with the at least one processor, cause the apparatus at least to:

determine a listening position within a physical space during rendering;

obtain at least one information of a virtual scene to render the virtual scene according to the at least one information;

obtain at least one acoustic characteristic of the physical space;

prepare an audio scene using the at least one information of the virtual scene and the at least one acoustic characteristic of the physical space, such that virtual scene acoustics and physical space acoustics are merged; and render the prepared audio scene according to the listening position.

2. The apparatus as claimed in claim 1, wherein the instructions, when executed with the at least one processor, cause the apparatus to initially enable the audio scene for rendering in the physical space, wherein the audio scene is configurable based on the at least one information of the virtual scene and the at least one acoustic characteristic of the physical space.

3. The apparatus as claimed in claim 1 wherein the instructions, when executed with the at least one processor, cause the apparatus to obtain at least one parameter representing an audio element of the virtual scene from a received bitstream.

4. The apparatus as claimed in claim 3, wherein the at least one parameter representing the audio element of the virtual scene comprises at least one of: an acoustic reflecting element; an acoustic material; an acoustic audio element spatial extent; or an acoustic environment properties of a six-degrees of freedom virtual scene.

5. The apparatus as claimed in claim 3, wherein the at least one parameter representing the audio element of the virtual scene comprises at least one of:

geometry information associated with the virtual scene;

a position of the audio element within the virtual scene;

a shape of the audio element within the virtual scene;

an acoustic material property of the audio element within the virtual scene;

a scattering property of the audio element within the virtual scene;
a transmission property of the audio element within the virtual scene;
a reverberation time property of the audio element within the virtual scene; or
a diffuse-to-direct sound ratio property of the audio element within the virtual scene.

6. The apparatus as claimed in claim 3, wherein the at least one parameter representing the audio element of the virtual scene is part of a six-degrees of freedom bitstream which describes the virtual scene acoustics.

7. The apparatus as claimed in claim 1, wherein the instructions, when executed with the at least one processor, cause the apparatus to obtain at least one control parameter to prepare the audio scene using the at least one information of the virtual scene and the at least one acoustic characteristic of the physical space, the at least one control parameter being obtained from a received bitstream.

8. The apparatus as claimed in claim 1, wherein the instructions, when executed with the at least one processor, cause the apparatus to:
obtain sensor information from at least one sensor positioned within the physical space; and
determine at least one parameter representing the at least one acoustic characteristic of the physical space based on the sensor information.

9. The apparatus as claimed in claim 8, wherein the at least one parameter representing the at least one acoustic characteristic of the physical space comprises at least one of:
specular reflected energy of the audio element within the physical space;
absorbed energy of the audio element within the physical space;
diffuse reflected energy of the audio element within the physical space;
transmitted energy of the audio element within the physical space;
coupled energy of the audio element within the physical space;
geometry information associated with the physical space;
a position of the audio element within the physical space;
a shape of the audio element within the physical space;
an acoustic material property of the audio element within the physical space;
a scattering property of the audio element within the physical space;
a transmission property of the audio element within the physical space;
a reverberation time property of the audio element within the physical space; or
a diffuse-to-direct sound ratio property of the audio element within the physical space.

10. The apparatus as claimed in claim 9, wherein the geometry information associated with the physical space comprises at least one mesh element defining a physical space geometry.

11. The apparatus as claimed in claim 10, wherein the at least one mesh element comprises at least one vertex parameter and at least one face parameter, wherein the at least one vertex parameter defines a position relative to a mesh origin position and the at least one face parameter comprises a vertex identifier identifying vertices defining a geometry of the at least one face parameter and a material parameter identifying an acoustic parameter defining an acoustic property associated with the at least one face parameter.

12. The apparatus as claimed in claim 11, wherein the material parameter identifying an acoustic parameter defining an acoustic property associated with the at least one face parameter comprises at least one of:
a scattering property of the at least one face parameter;
a transmission property of the at least one face parameter;
a reverberation time property of the at least one face parameter; or
a diffuse-to-direct sound ratio property of the at least one face parameter.

13. The apparatus as claimed in claim 1, wherein the instructions, when executed with the at least one processor, cause the apparatus to prepare the audio scene using the at least one information of the virtual scene and the at least one acoustic characteristic of the physical space, such that the virtual scene acoustics and the physical space acoustics are merged to generate a combined parameter.

14. The apparatus as claimed in claim 13, wherein the instructions, when executed with the at least one processor, cause the apparatus to:
merge a first bitstream comprising the at least one information of the virtual scene with a unified scene representation; and
merge a second bitstream comprising the at least one acoustic characteristic of the physical space with the unified scene representation.

15. The apparatus as claimed in claim 14, wherein the at least one acoustic characteristic of the physical space comprises at least one of: at least one reflecting element geometry parameter; or at least one reflecting element acoustic property.

16. The apparatus as claimed in claim 14, wherein the instructions, when executed with the at least one processor, cause the apparatus to:
determine at least one reverberation acoustic parameter associated with the physical space based on the at least one acoustic characteristic of the physical space;
determine at least one reverberation acoustic parameter associated with the virtual scene based on the at least one information of the virtual scene; and
determine the combined geometry parameter based on the at least one reverberation acoustic parameter associated with the physical space and at least one reverberation acoustic parameter associated with the virtual scene.

17. The apparatus as claimed in claim 13, wherein the instructions, when executed with the at least one processor, cause the apparatus to:
merge a first bitstream comprising the at least one information of the virtual scene with a unified scene representation; and
merge the at least one acoustic characteristic of the physical space with the unified scene representation.

18. The apparatus as claimed in claim 1, wherein the instructions, when executed with the at least one processor, cause the apparatus to:
obtain at least one virtual scene description parameter based on the listening position within the physical space during rendering and the at least one information of the virtual scene; and
generate a combined geometry parameter based on a combination of the at least one virtual scene description parameter and the at least one acoustic characteristic of the physical space.

19. A method for an apparatus rendering an audio scene in a physical space, the method comprising:
determining a listening position within the physical space during rendering;

obtaining at least one information of a virtual scene to render the virtual scene according to the at least one information;

obtaining at least one acoustic characteristic of the physical space;

preparing the audio scene using the at least one information of the virtual scene and the at least one acoustic characteristic of the physical space, such that virtual scene acoustics and physical space acoustics are merged; and rendering the prepared audio scene according to the listening position.

20. A non-transitory program storage device readable with an apparatus, tangibly embodying a program of instructions executable with the apparatus for performing at least the following:

determining a listening position within the physical space during rendering;

obtaining at least one information of a virtual scene to render the virtual scene according to the at least one information; obtaining at least one acoustic characteristic of the physical space;

preparing an audio scene using the at least one information of the virtual scene and the at least one acoustic characteristic of the physical space, such that virtual scene acoustics and physical space acoustics are merged; and rendering the prepared audio scene according to the listening position.

* * * * *